Oct. 9, 1945.  R. HART  2,386,395
SHOCK ABSORBER FOR PARACHUTES
Filed March 24, 1945  2 Sheets-Sheet 1

INVENTOR
Russell Hart.

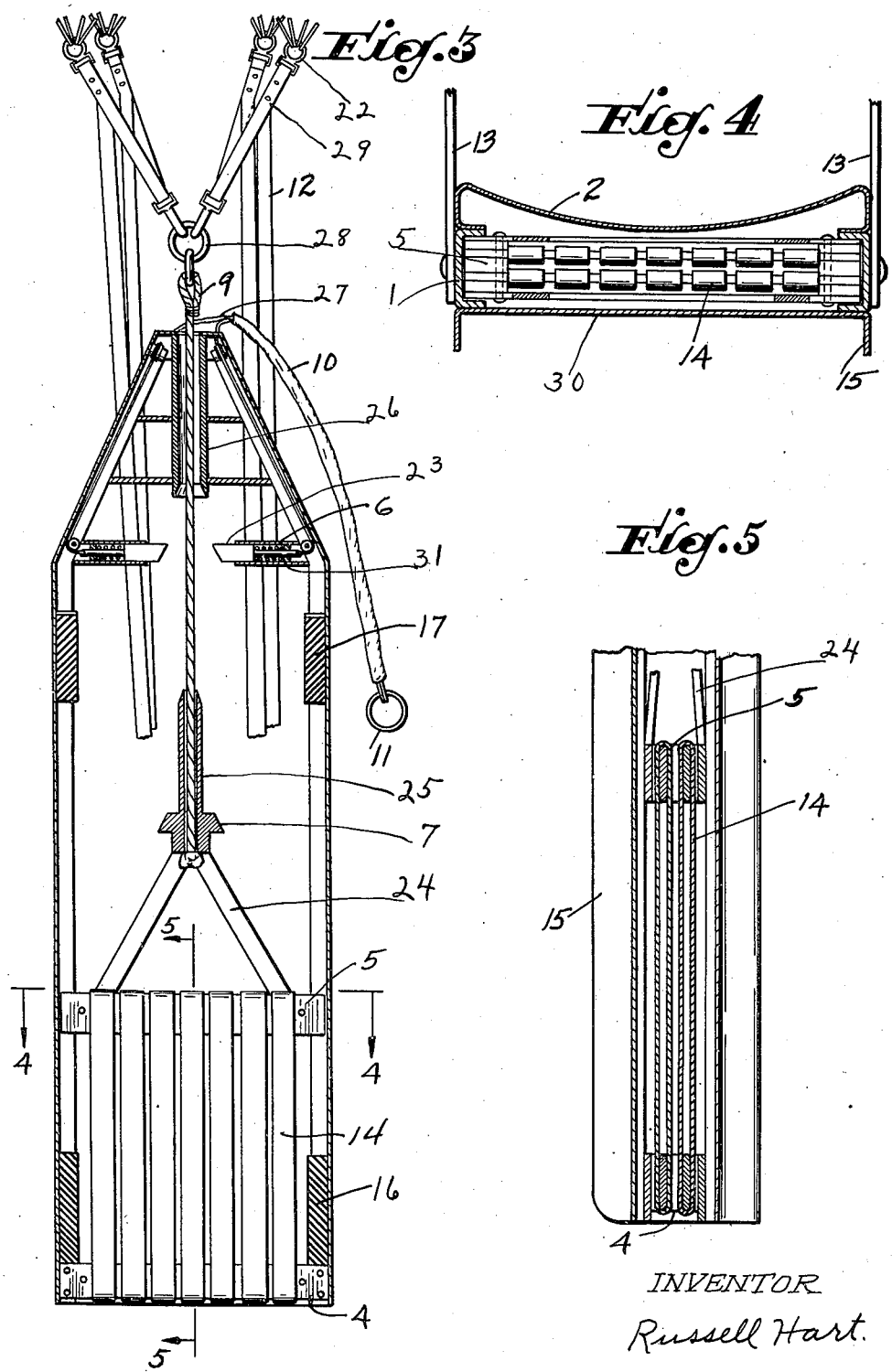

Patented Oct. 9, 1945

2,386,395

UNITED STATES PATENT OFFICE 2,386,395

SHOCK ABSORBER FOR PARACHUTES

Russell Hart, Los Angeles, Calif.

Application March 24, 1945, Serial No. 584,587

5 Claims. (Cl. 244—151)

My invention relates to a method for absorbing the shock of landing by parachute. The more important objects are, first, to absorb and store a part of the energy in the shock caused by the sudden opening of parachute; second, to again release this stored energy to reduce the speed or shock of landing; third, and or to store energy in this device before jumping with the parachute and then releasing this stored energy to reduce the speed or shock of landing. This method will allow the parachutist to land safely with heavier equipment using same parachute, or he may use a smaller parachute and descend to within a few feet of the ground at a speed considerably above that deemed safe for landing and then reduce this speed to a safe limit by releasing the energy stored in this device to pull down faster on the parachute which in turn reduces his downward momentum by several feet per second.

Other objects and advantages of my invention will appear hereinafter, and while I show herewith and will describe one form of construction, I desire to be understood that I do not limit myself to such form, since various changes and adaptations may be made therein without departing from the spirit of the invention as hereinafter claimed.

The objects of this invention are attained in the manner illustrated in the accompanying drawings, in which—

Figure 1 shows a rear view of the device attached to the descending parachutist and having the rear cover 30 removed to expose the operating parts in the cocked or up position. Energy is stored in the stretched rubber bands or strips 14 and can be released by pulling latches 23.

Figure 3 is a longitudinal cross section of Figure 1 showing the operating parts uncocked with most of the stored energy released.

Figure 4 is a partial plan section taken on line 4—4 of Figure 3.

Figure 5 is a partial section taken on line 5—5 of Figure 3.

Figure 1:
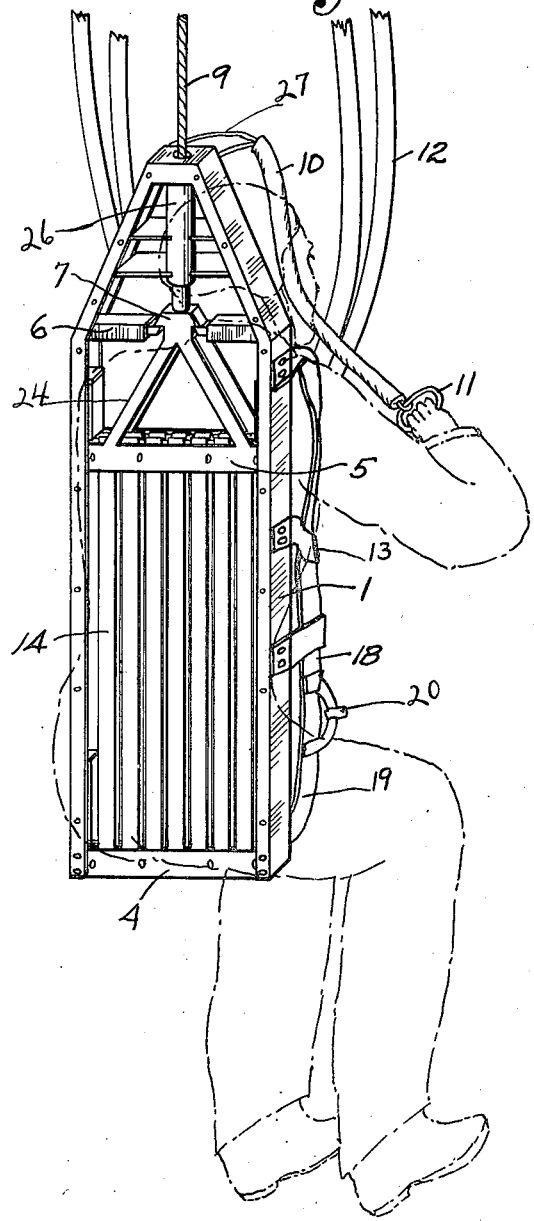
Figure 2:
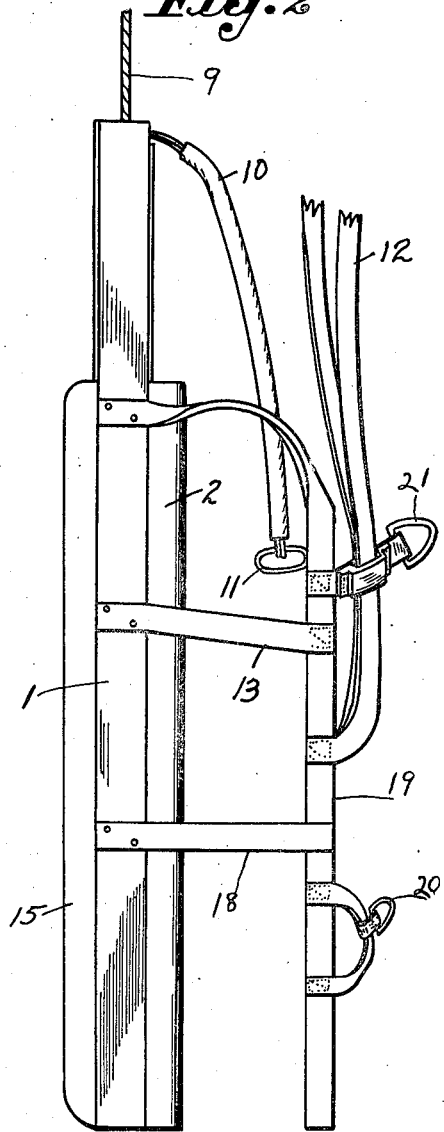
Figure 2 is a side elevation of Figure 1.

The operating parts of this device are mostly enclosed and supported by a frame 1 which can be made of a suitable channel shape of dural, etc. This frame can serve as a back support for the parachutist while he is sitting in a seat of the aircraft. The folded parachute is packed and fastened to the back of this frame in any suitable manner. The seat in aircraft should be designed so that the frame 1 with the packed parachute fastened to its back will fit freely and in such a way as to give the parachutist a comfortable back support. The whole assembly can be designed to snap on or off the parachutist in a minimum of time so that he can move about the aircraft unencumbered. The frame 1 can in effect serve as the back of the aircraft seat.

The parachute is released from the back of frame 1 and opened by the parachutist pulling a rip cord in the usual way. The opened parachute canopy is attached to ring 28 by its quadrant straps 29. Suspension rope 9 is attached to ring 28 and extends downward through a hole in the top of frame 1, through guiding socket 26, through a hole in the center of guide bayonet 25 and catch 7 where it is fastened by a knot or other suitable means. Catch 7 is fastened to the moveable horizontal bar 5 by support bars 24. The ends of bar 5 slides freely up and down in and are guided by the channel at each side of frame 1. This moveable bar 5 is elastically connected to stationary bar 4 at the bottom of frame 1 by suitable rubber bands or metallic springs 14. These rubber bands or springs 14 are unstretched or normal when bar 5 is approximately down to the top of the bottom bumpers 16. They are stretched to a maximum when bar 5 is up against the bottom of the top bumper 17. Bumpers 16 and 17 are made of elastic material such as rubber or springs and are placed in the guide channels in each side of frame 1 at approximately the position shown. Their purpose is to stop and absorb the jar of the sudden up and down motion of bar 5. In Figure 3, rope 9 is intended to be long enough to allow bar 5 to be stopped in its downward motion by bumpers 16. Bar 5 is locked in its upper position by latches 23 sliding in guides 6 fastened to frame 1 and engaging catch 7. Springs 31 tend to keep the latches in the engaging position. The latches 23 are disengaged from catch 7 by pulling ring 11 which is attached to latch strings 27. The catch 7 is held in a central position when latched by the guide bayonet 25 sliding up into the guiding socket 26.

I prefer to use a number of natural or synthetic rubber bands to elastically connect moveable bar 5 to fixed bar 4. I arrange these bands in a row and use several rows in parallel. This gives high energy storage, quick response, and a minimum of breakage.

The parachutist is attached to the front of frame 1 and supported by strap 19, one end of which is attached to the right side of frame 1, Figure 1, near its top and passes over parachutist's right shoulder and extends downward along his right side and under his hips, then up along his left side and over the left shoulder and is attached to the left side of the frame 1 near its top. Two straps, not shown, are fastened to strap 19 and go around each leg of the parachutist and snap into rings 20 on each side. Straps 13 and 18 connect the frame 1 and strap 19 on each side at approximately the position shown. There is also a strap, not shown, attached to strap 19 on the left side of parachutist and extends across his chest and snaps into ring 21 attached to strap 19 on his right side. Other means of attaching the parachutist to frame 1 will occur to persons skilled in this art.

On the front of frame 1 is fastened a curved cover 2 to act as a backrest for parachutist while seated in aircraft. It is preferably upholstered. A second flat cover, not shown, can be attached to the front of frame 1 under cover 2 to give additional bracing if desired.

On the back of frame 1 is fastened a flat cover 30 to act as bracing. This cover 30 also acts as a surface to which the packed parachute is fastened by suitable straps. A backward extending flange 15 along each side of frame 1 is desirable for bracing and also to serve as a guide to keep the packed parachute in correct shape and position to fit freely into the seat of aircraft.

When this device is in the cocked position, the parachute quadrant straps 29 are beyond the upward reach of the parachutist and he will be unable to spill air from the canopy to guide his descent. To overcome this I attach a shunt strap 12 to each of the quadrant straps 29 and attach their other end to ring 21 on the chest of parachutist. These straps 12 are elastic and easily stretch a distance slightly greater than the maximum up and down movement of bar 5, but act as non-elastic straps beyond this distance. The parachutist can spill air from any quadrant of the canopy by pulling down on these shunt straps.

One way to operate this invention is for the parachutist to jump from the aircraft with this device unlatched or uncocked and hence have no energy stored in the rubber bands 14. He allows himself to fall far enough to gain considerable speed and then pulls the ripcord of parachute which will open with a sudden jerk. This sudden jerk will pull up on rope 9 and bar 5 to stretch the rubber bands 14 and cause catch 7 to rise past latches 23 which are forced outward in guide 6 against springs 31 by the bevel on top of catch 7. As soon as the bottom of catch 7 rises above the top of latches 23 the springs 31 force the latches inward and hold the catch in the cocked position. Considerable energy is now stored in the stretched rubber bands and will be available quickly to pull bar 5 rapidly downward when the latches are disengaged from the catch by pulling on the latch strings 27. The parachutist looks downward and an instant before hitting the ground he pulls on ring 11 attached to latch strings 27 which are protected from accidental pulling by guard cable 10. This causes the latches to disengage the catch and allows the stretched rubber bands to pull downward on bar 5 and rope 9 attached to parachute. They also pull upward on fixed bar 4, frame 1 and the attached parachutist. The parachute will strongly resist a sudden increase in downward speed and the net result is that the parachutist's speed of descent will be decreased several feet per second just before he hits the ground. A similar result is now accomplished by the parachutist, in a much lesser degree, pulling down on the quadrant straps with his arms.

Another useful way to operate this invention is for the rubber bands to be stretched and bar 5 latched in the up position before the parachutist jumps from the aircraft. This method is perhaps more suitable for military use where the paratrooper is heavily loaded with arms and supplies because the rubber bands can be made of heavier rubber and more numerous.

This device can be used with freight parachutes providing some automatic mechanism is provided to pull the latches just before the load hits the ground.

Suitable metallic springs or other elastic substances can be substituted for the rubber bands or bumpers of this device without departing from the intent of this invention.

I claim as my invention:

1. In a shock absorber for parachutes, a rigid frame, a load attached to said frame, a suspension rope leading from the parachute down through a hole in the top of frame and attached to a horizontal bar which is free to move up and down inside the frame, a fixed horizontal bar in the bottom of frame, said moveable bar and fixed bar being elastically connected, a catch attached to the moveable bar, latches sliding in guides attached to the frame to engage said catch, and means to disengage the latches from said catch.

2. In a shock absorber for parachutes, a rigid frame adapted to be attached to a parachutist, a suspension rope leading from the parachute downward through a hole in the top of frame to a horizontal bar which is free to move up and down inside frame, a fixed horizontal bar in the bottom of frame, an elastic substance connecting said moveable bar and fixed bar, a catch attached to the moveable bar, latches sliding in guides attached to the frame to engage said catch, and means for the parachutist to disengage the latches from said catch.

3. In a shock absorber for parachutes, a rigid frame attached to the parachutist, channels in the inner edge of each side of frame, a horizontal bar free to move up and down inside the frame and having its ends guided by said channels, a fixed horizontal bar in the bottom of frame, an elastic substance connecting the fixed bar to moveable bar, a suspension rope attached to the moveable bar and leading upward through a hole in the top of frame to the parachute, a catch attached to the moveable bar, latches sliding in guides attached to the frame to engage said catch, and means for the parachutist to disengage these latches from said catch.

4. In a shock absorber for parachutes, a rigid frame adapted to be attached to a parachutist, channels in the inner edge of each side of frame, a horizontal bar free to move up and down inside the frame and having its ends guided by said channels, a catch attached to the top side of said moveable bar, a guide bayonet attached to the top of said catch, a guiding socket attached to the inside of frame top at its approximate center and facing downward to receive said guide bayonet, a suspension rope fastened to the moveable bar and extending upward through a hole in the center of catch and bayonet and through the guiding socket and hole in the top of frame to the parachute, a fixed horizontal bar in the bottom of frame, an elastic substance connecting the said moveable bar to fixed bar, latches sliding in guides attached to the frame to engage said catch, and means for the parachutist to disengage these latches from said catch.

5. In a shock absorber for parachutes, a rigid frame adapted to be attached to a parachutist, channels in the inner edge of each side of frame, a horizontal bar free to move up and down inside the frame and having its ends extending into and guided by said channels, elastic bumpers in the top and bottom of each channel, a catch attached to the top of said moveable bar, a guide bayonet attached to the top of said catch, a guiding socket attached to the inside of frame top at its approximate center and facing downward to receive said guide bayonet, a suspension rope fastened to the underside of said catch and extending upward through a center hole in the catch and guide bayonet and through the guiding socket and hole in the top of frame to the parachute, a fixed horizontal bar in the bottom of frame, a group of elastic bands connecting said moveable bar to the fixed bar, latches sliding in guides attached to the frame to engage said catch when the moveable bar is in the up position, and means for the parachutist to disengage the latches from said catch.

RUSSELL HART.